United States Patent
Koarashi

(10) Patent No.: US 7,693,892 B2
(45) Date of Patent: Apr. 6, 2010

(54) NFS SERVER, NFS SERVER CONTROL PROGRAM AND NFS SERVER CONTROL METHOD

(75) Inventor: Hiroshi Koarashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 11/448,747

(22) Filed: Jun. 8, 2006

(65) Prior Publication Data
US 2007/0214143 A1 Sep. 13, 2007

(30) Foreign Application Priority Data
Mar. 10, 2006 (JP) ............... 2006-065454

(51) Int. Cl.
*G06F 7/00* (2006.01)
*G06F 17/00* (2006.01)
(52) U.S. Cl. .................... 707/704; 707/827
(58) Field of Classification Search ........... 707/8, 707/200
See application file for complete search history.

(56) References Cited

U.S. PATENT DOCUMENTS 6,493,804 B1 * 12/2002 Soltis et al. .............. 711/152
7,289,992 B2 * 10/2007 Walker ...................... 707/8
7,313,557 B1 * 12/2007 Noveck ..................... 707/8
7,356,531 B1 * 4/2008 Popelka et al. ............ 707/8
2006/0212453 A1 * 9/2006 Eshel et al. ................ 707/10

FOREIGN PATENT DOCUMENTS

JP 2003-044310 2/2003
JP 2003-330906 11/2003

* cited by examiner

*Primary Examiner*—Etienne P LeRoux
*Assistant Examiner*—Cindy Nguyen
(74) *Attorney, Agent, or Firm*—Fujitsu Patent Center

(57) ABSTRACT

An NFS server, an NFS server control program and an NFS control method can reduce the extended lock reacquisition period. The NFS server comprises a prior-to-restart lock acquiring client information recording section for recording the identifiers of the NFS clients that have acquired locks before a restart of the NFS server and the number of the first files that is the number of files for which locks have been acquired, a lock acquiring client information recording section for recording the identifiers of the NFS clients that have reacquired locks after the restart of the NFS server and the number of the second files that is the number of files for which lock have been reacquired and an NSM that ends the reception of any lock reacquisition request from any of the NFS clients when the number of the second files of all the NFS clients acquired by the prior-to-restart lock acquiring client information recording section becomes equal to the number of the first files.

18 Claims, 4 Drawing Sheets

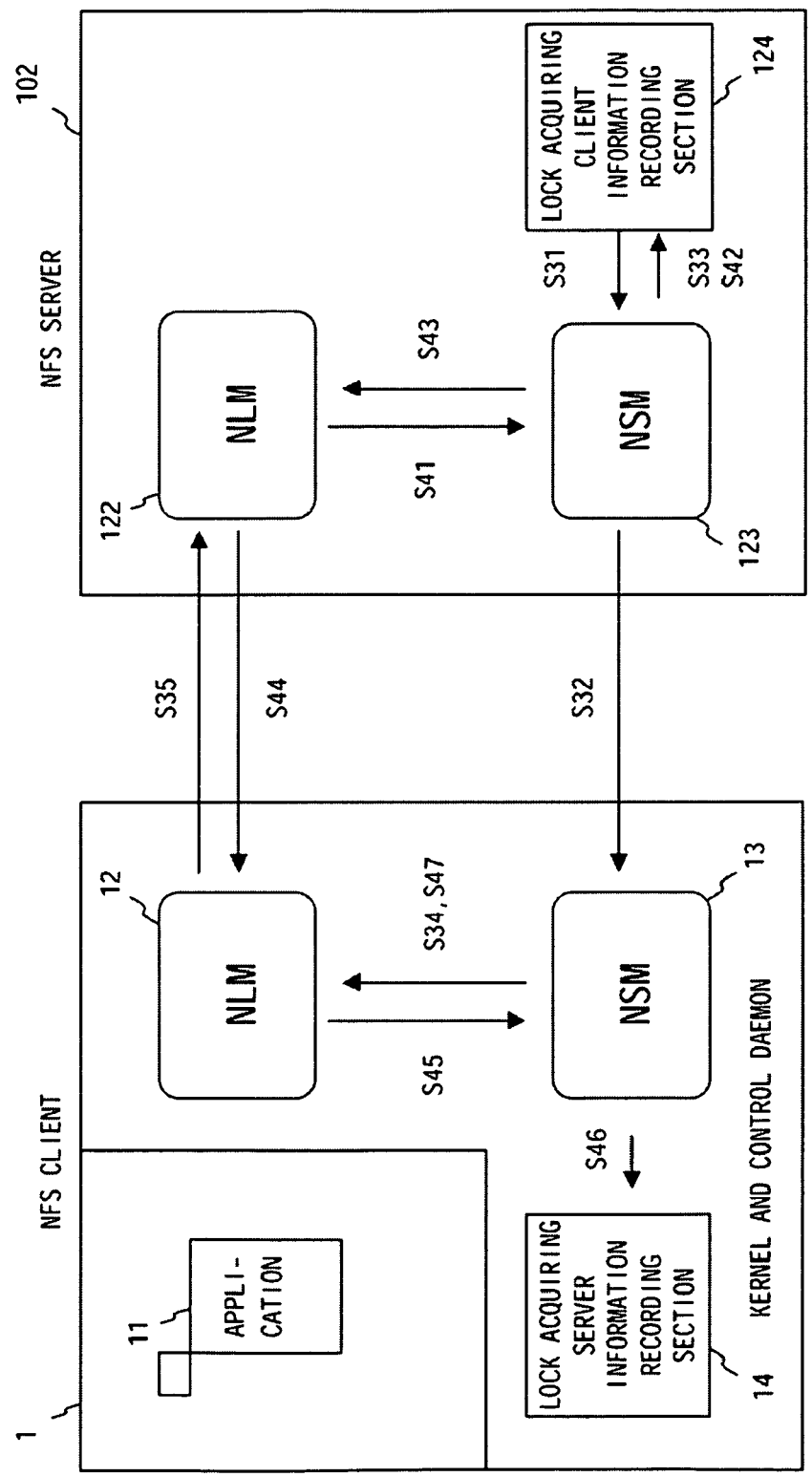

NFS SERVER, NFS SERVER CONTROL PROGRAM AND NFS SERVER CONTROL METHOD

BACKGROUND OF THE INVENTION

1. Field of the Invention

This invention relates to an NFS server, an NFS server control program and an NFS server control method that can suitably be used for an NFS (network file system).

2. Description of the Related Art

To begin with, a known NFS will be described in terms of configuration.

FIG. 3 of the accompanying drawings is a schematic block diagram of a known NFS server, illustrating the configuration and the operation of a lock acquisition process thereof. The illustrated NFS comprises an NFS client 1 and an NFS server 102. The NFS client 1 by turn comprises an application 11, an NLM (network lock manager) 12, an NSM (network status monitor) 13, a lock acquiring server information recording section 14. The NFS server 102 comprises an NLM 122, an NSM 123 and a lock acquiring client information recording section 124. The lock acquiring server information recording section 14 is a nonvolatile recording apparatus for recording a list of the names of the hosts of the NFS server that is acquiring a lock. The lock acquiring client information recording section 124 is also a nonvolatile recording apparatus for recording a list of the names of the hosts of the NFS client that is acquiring a lock.

When the application 11 of the NFS client 1 acquires the lock of a file of the NFS server 102, it executes a lock acquisition process. When the NFS server 102 is restarted for a takeover, for instance, it executes a lock reacquisition process for the file for which the NFS client 1 had acquired the lock before the restart.

Now, the operation of a lock acquisition process of the known NFS will be described below.

Firstly, the application 11 of the NFS client 1 transmits a directive (fcnt1 ( ) system call) for a lock acquisition request to the NLM 12 (S11). Upon receiving the directive, the NLM 12 transmits a directive for recording in the lock acquiring server information recording section 14 to the NSM 13 along with the names of the hosts of the NFS server 102, to which the lock acquiring request is addressed (S12). Upon receiving the directive for recording, the NSM 13 records the names of the hosts of the NFS server 102, if the names have not been recorded yet, in the lock acquiring server information recording section 14 (S13) and returns a response to the directive for recording to the NLM 12 (S14). Upon receiving the response, the NLM 12 transmits a lock acquisition request to the NFS server 102 (S15).

Upon receiving the lock acquiring request, the NLM 122 of the NFS server 102 acquires the lock according to the lock acquisition request and transmits a directive for recording the acquired lock in the lock acquiring client information recording section 124 to the NSM 123 along with the names of the hosts of the lock acquisition requesting NFS client 1 (S21). Upon receiving the directive for recording, the NSM 123 records the names of the hosts of the NFS client 1, if the names have not been recorded yet, in the lock acquiring client information recording section 124 (S22) and returns a response to the directive for recording to the NLM 122 (S23). Upon receiving the response, the NLM 122 transmits a lock response to the NFS client 1 (S24). Upon receiving the lock response, the NLM 12 of the NFS client 1 returns a response to directive of the lock acquisition request to the application 11 (S25) and ends the lock acquisition process.

Thereafter, as long as the NFS client 1 holds the acquired lock, the NFS server 102 keeps the recorded names of the hosts of the NFS client 1, whereas the NFS client 1 keeps the recorded names of the hosts of the NFS server 102.

If the NFS server is restarted typically at the time when a takeover of the NFS server occurs in the NFS having a cluster configuration, the NFS server has forgotten the details of the lock and hence requests the NFS client to reacquire the lock that had been acquired before the restart.

Now, the operation for the lock reacquisition process of the known NFS will be described below.

FIG. 4 is a schematic block diagram of the known NFS server, illustrating the configuration and the operation of a lock reacquisition process thereof. In FIG. 4, the reference symbols same as those of FIG. 3 respectively indicate the objects same as or equivalent to those of FIG. 3 and hence will not be described here any further.

In order to prevent the lock of the file that the NFS client is trying to reacquire from being acquired by some other NFS client, an extended lock reacquisition period (normally about 45 seconds), which is a fixed period, is predefined in the NLM 12. After the restart of the NFS server 102, the NLM 122 starts the extended lock reacquisition period and receives only lock reacquisition requests in this period and does not receive any ordinary lock acquisition request.

Firstly, the NSM 123 of the NFS server 102 reads in the contents of the lock acquiring client information recording section 124 and acquires the names of the hosts (S31), the locks of which had been acquired before the restart. Then, it transmits a notification indicating that the lock needs to be reacquired (SM_NOTIFY) to the NFS client 1 (S32) and deletes the information on the NFS client 1 in the lock acquiring client information recording section 124 (S33).

Upon receiving the notification, the NSM 13 of the NFS client 1 transmits a directive for a lock reacquisition request to the NLM 12 (S34). Upon receiving the directive for a lock reacquisition request, the NLM 12 transmits a lock reacquisition request to the NFS server 102 according to the directive (S35). A lock acquisition request and a lock reacquisition request has a same message format and if the reclaim flag contained in the message is No, it indicates a lock acquisition request but, if the reclaim flag contained in the message is Yes, it indicates a lock reacquisition request.

Upon receiving the lock reacquisition request from the NFS client during the extended lock reacquisition period, the NLM 122 of the NFS server 102 determines if it is a lock reacquisition request or not. If it is a lock reacquisition request, the NLM 122 reacquires the lock and transmits a directive for recording in the lock acquiring client information recording section 124 to the NSM 123 along with the names of the hosts of the lock reacquisition requesting NFS client 1 (S41). During the extended lock reacquisition period, the NLM 122 determines if it is a lock reacquisition request or not according to the reclaim flag of the received message and executes the processing step of S41 if the received message shows a lock reacquisition request (reclaim flag=Yes) but returns an error message to the NFS client who sent the lock acquisition request if the received message shows a lock acquisition request (reclaim flag=No).

Upon receiving the directive for recording, the NSM 123 records the names of the hosts of the NFS client 1 in the lock acquiring client information recording section 124 (S42) and returns a response to the directive for recording to the NLM 122 (S43). Upon receiving the response, the NLM 122 transmits a response to the lock reacquisition request to the NFS client 1 (S44). Upon receiving the response, the NLM 12 of the NFS client 1 transmits a directive for recording in the lock acquiring server information recording section 14 to the NSM 13 along with the names of the hosts of the NFS server 102, to which the lock acquisition request is addressed (S45). Upon receiving the directive for recording, the NSM 13 records the names of the hosts of the NFS server 102 in the lock acquiring server information recording section 14 (S46) and returns a response to the directive for recording to the NLM 12 (S47).

Thereafter, upon receiving a lock reacquisition request from the NFS client, the NLM 122 executes the processing steps of S41 through S47. In the processing step of S41, the NLM 122 determines if the extended lock reacquisition period has elapsed or not and, when the extended lock reacquisition period ends, it terminates the lock reacquisition process. Thereafter, the NLM 122 receives an ordinary lock acquisition request for a lock acquisition process.

As a prior art system that is associated with the present invention, clustering systems having an interface section that is adapted to be driven by a battery and transfer management data to a second server machine when a trouble occurs in a first server machine so that the second server machine continues the service according to the management data are known (see, for example, Patent Document 1: Jpn. Pat. Appln. Laid-Open Publication No. 2003-44310).

However, as the time that needs to be spent for starting a node of a cluster has been reduced and NFS clients have been improved so as to operate at high speed in recent years, the above described extended lock reacquisition period has become too long. Additionally, the time period necessary for reacquiring a lock varies depending on the system and the situation, it is has become difficult for the person who manages the NFS to appropriately predefine the extended lock reacquisition period.

SUMMARY OF THE INVENTION

In view of the above-identified problems, it is therefore the object of the present invention to provide an NFS server, an NFS server control program and an NFS server control method that can reduce the extended lock reacquisition period.

In an aspect of the present invention, the above object of the invention is achieved by providing an NFS server for controlling the locks of an NFS, the NFS server comprising: a first lock information acquiring section that acquires the identifiers of the NFS clients that acquired locks before a restart of the NFS server and a first number of files that is the number of files for which the NFS clients have acquired the locks; a second lock information acquiring section that acquires the identifiers of the NFS clients that reacquired the locks after a restart of the NFS server and a second number of files that is the number of files for which the NFS clients have reacquired the locks; and a lock reacquisition ending section that ends the reception of lock reacquisition requests from NFS clients when the second number of files of all the NFS clients acquired by the first lock information acquiring section has become equal to the first number of files according to the first number of files acquired by the first lock information acquiring section for each NFS client and the second number of files acquired by the second lock information acquiring section for each NFS client.

Preferably, in an NFS server according to the invention, if there is an NFS client that has not transmitted any lock reacquisition request at all among the NFS clients recorded in the first lock information recording section at the time when a predefined client operation confirmation period has elapsed after a restart of the NFS server, the lock reacquisition ending section additionally ends the reception of lock reacquisition requests from the NFS client.

Preferably, in an NFS server according to the invention, the second lock information acquiring section additionally records the clock times of the reacquisition requests from NFS clients and other information.

In another aspect of the present invention, there is provided an NFS server control program for causing the computer of an NFS server to control the locks of an NFS, the program comprising: a first lock information acquiring step that acquires the identifiers of the NFS clients that acquired locks before a restart of the NFS server and a first number of files that is the number of files for which the NFS clients have acquired the locks; a second lock information acquiring step that acquires the identifiers of the NFS clients that reacquired the locks after a restart of the NFS server and a second number of files that is the number of files for which the NFS clients have reacquired the locks; and a lock reacquisition ending step that ends the reception of lock reacquisition requests from NFS clients when the second number of files of all the NFS clients acquired in the first lock information acquiring step has become equal to the first number of files according to the first number of files acquired in the first lock information acquiring step for each NFS client and the second number of files acquired in the second lock information acquiring step for each NFS client.

In still another aspect of the present invention, there is provided an NFS server control method for controlling the locks of an NFS, the method comprising: a first lock information acquiring step that acquires the identifiers of the NFS clients that acquired locks before a restart of the NFS server and a first number of files that is the number of files for which the NFS clients have acquired the locks; a second lock information acquiring step that acquires the identifiers of the NFS clients that reacquired the locks after a restart of the NFS server and a second number of files that is the number of files for which the NFS clients have reacquired the locks; and a lock reacquisition ending step that ends the reception of lock reacquisition requests from NFS clients when the second number of files of all the NFS clients acquired in the first lock information acquiring step has become equal to the first number of files according to the first number of files acquired in the first lock information acquiring step for each NFS client and the second number of files acquired in the second lock information acquiring step for each NFS client.

Thus, according to the present invention, it is possible to reduce the extended lock reacquisition period at the time of a restart of an NFS server.

BRIEF DESCRIPTION OF THE DRAWINGS

FIG. 4 is a schematic block diagram of the known NFS of FIG. 3, illustrating the configuration and the operation of a lock reacquisition process thereof.

DETAILED DESCRIPTION OF THE PREFERRED EMBODIMENT(S)

Now, the present invention will be described in greater detail by referring to the accompanying drawings that illustrate a preferred embodiment of the invention.

Now, the configuration of an NFS to which this embodiment is applicable will be described below.

Figure 1:
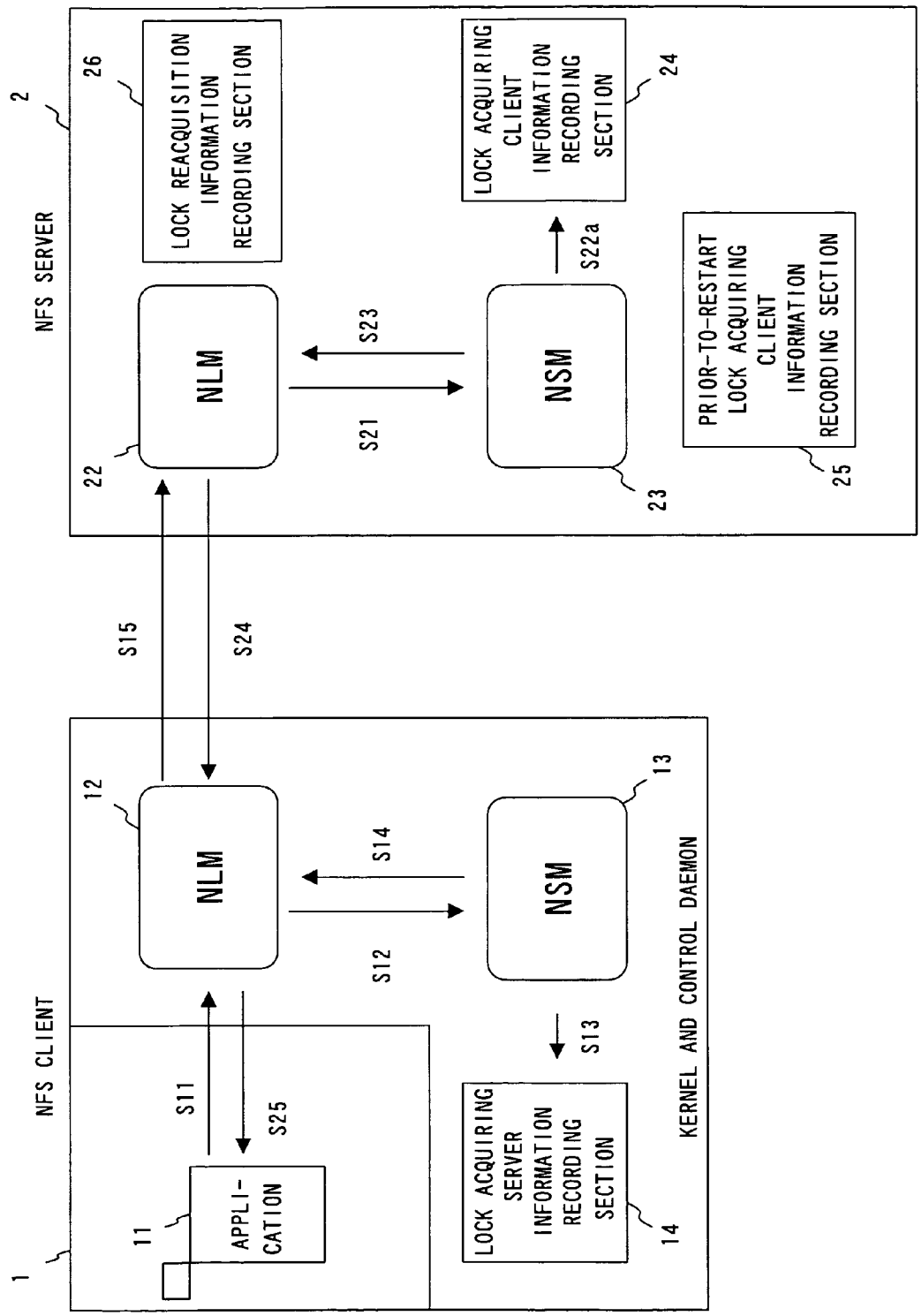
FIG. 1 is a schematic block diagram of an NFS to which the present invention is applicable, illustrating the configuration and the operation of a lock acquisition process thereof.

FIG. 1 is a schematic block diagram of the NFS to which the present invention is applicable, illustrating the configuration and the operation of a lock acquisition process thereof. In FIG. 1, the reference symbols same as those of FIG. 3 respectively indicate the objects same as or equivalent to those of FIG. 3 and hence will not be described here any further. By comparing FIG. 1 with FIG. 3, it will be appreciated that the NFS server 102 of FIG. 3 is replaced by an NFS server 2 while the NLM 122, NSM 123, the lock acquiring client information recording section 124 of FIG. 3 are replaced respectively by an NLM 22, an NSM 23, a lock acquiring client information recording section 24 and the NFS of FIG. 1 further comprises a prior-to-restart lock acquiring client information recording section 25 and a lock reacquisition information recording section 26.

The lock acquiring client information recording section 24 is a nonvolatile recording apparatus that is adapted to prepare an entry for each NFS client that is acquiring one or more than one locks and record the names of the hosts of the NFS client and the number of locks, or the files, that the NFS client is acquiring as lock acquiring client information in the entry. The prior-to-restart lock acquiring client information recording section 25 is a nonvolatile recording apparatus that is adapted to prepare an entry for each NFS client that is acquiring one or more than one locks before a restart of the NFS server 2 after a restart of the NFS server 2, record the names of the hosts of the NFS client and the number of locks, or the files, that the NFS client is acquiring before the restart as prior-to-restart lock acquiring client information. In other words, the number of locks being acquired by an NFS client before a restart is the number of files that the NFS client may reacquire after the restart of the NFS server 2. The lock reacquisition information recording section 26 is adapted to record the clock time when the NFS server 2 receives a lock reacquisition request and so on.

Now, the operation of a lock acquisition process of the NFS to which this embodiment is applicable will be described below.

Figure 3:
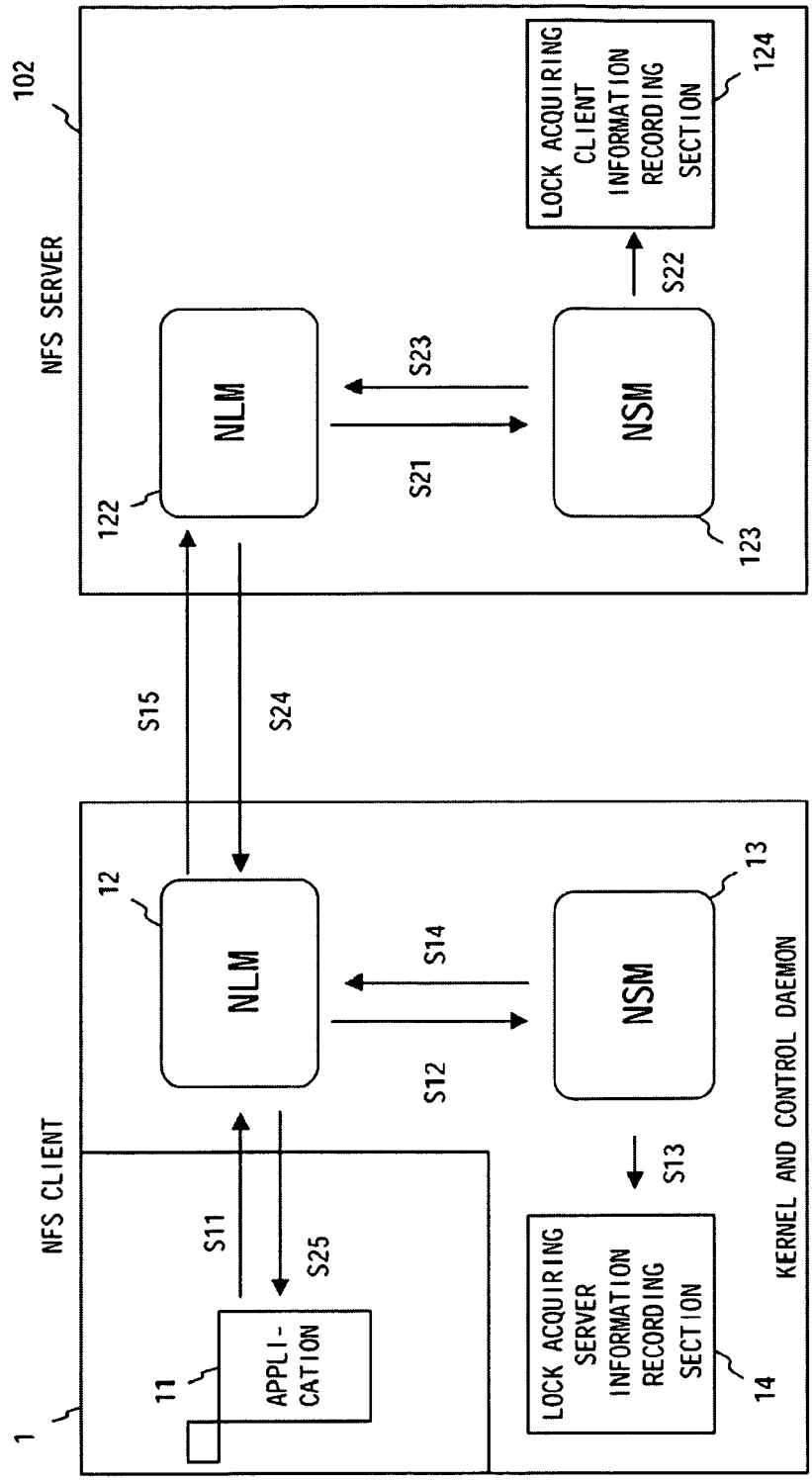
FIG. 3 is a schematic block diagram of a known NFS, illustrating the configuration and the operation of a lock acquisition process thereof.

By comparing FIG. 1 with FIG. 3, it will be appreciated that the NFS of FIG. 1 executes a processing step S22a in place of the processing step S22. The processing steps S11 through S15 of FIG. 1 are same as the corresponding lock acquisition processing steps of the known NFS of FIG. 3. Subsequently, upon receiving a directive for recording in the lock acquiring client information recording section 24, the NSM 23 increments the number of locks acquired by the NFS client 1 by one (S22a) and returns a response to the directive for recording to the NLM 22 (S23). Then, the NSM 23 retrieves the entry of the NFS client 1 in the lock acquiring client information recording section 24 and prepares an entry for the NFS client 1 and records one in the entry if there is no entry of the NFS client 1, whereas it simply increments the number of locks acquired by the NFS client 1 by one if there is an entry of the NFS client 1. Thereafter, the processing steps S24 and S25 are executed as in the known lock acquisition process to end the process.

Thereafter, the NSM 23 decrements the number of files for which locks have been acquired by one from the entry of the corresponding NFS client when the lock is unlocked.

As a result of the lock acquisition process, the NFS server 2 can obtain the number of files for which locks have been acquired for each NFS client before a restart after the restart.

Now, the operation of a lock reacquisition process of the NFS to which this embodiment is applicable will be described below.

Figure 2:
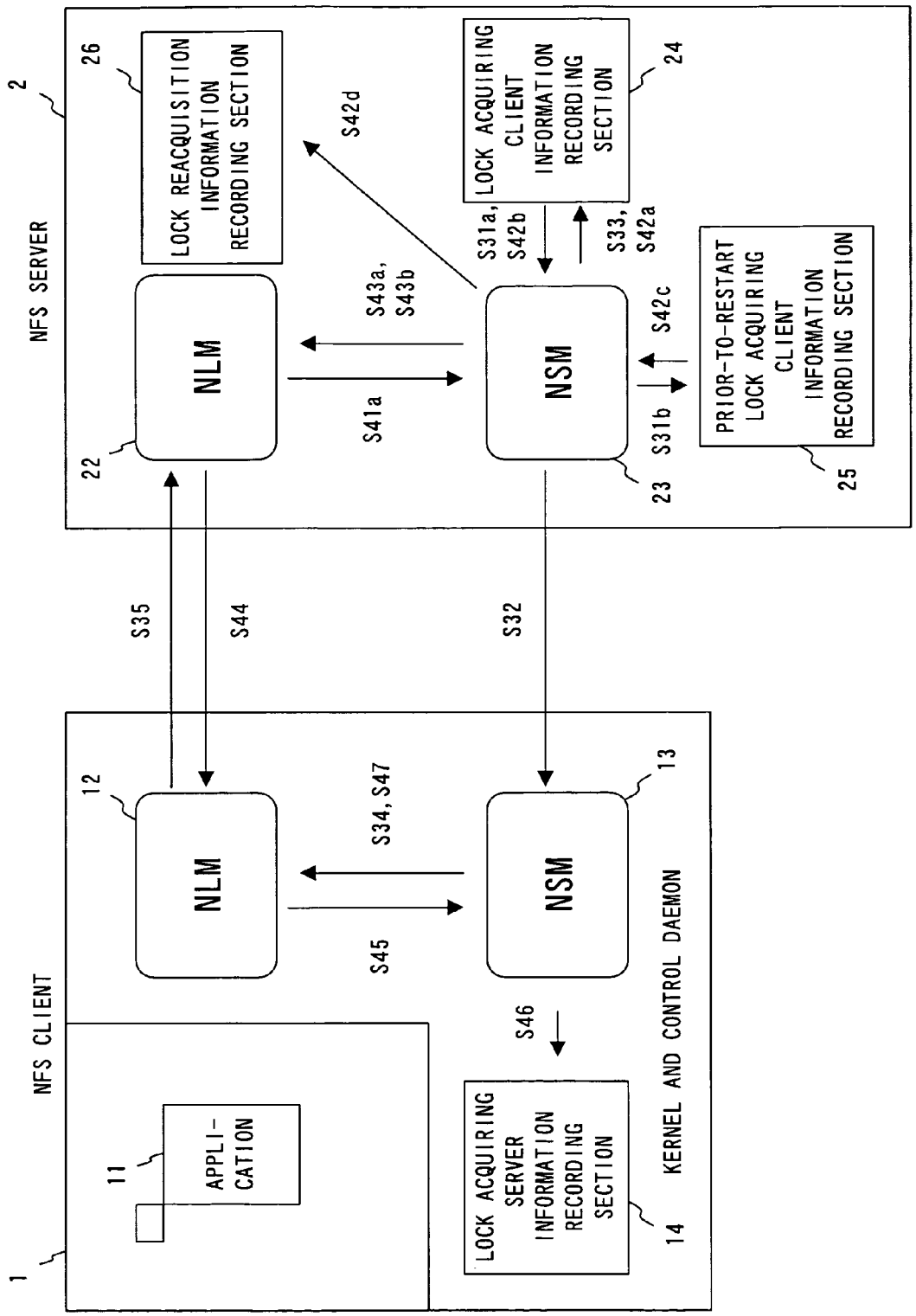
FIG. 2 is a schematic block diagram of the NFS of FIG. 1, illustrating the configuration and the operation of a lock reacquisition process thereof.

FIG. 2 is a schematic block diagram of the NFS of FIG. 1, illustrating the configuration and the operation of a lock reacquisition process thereof. In FIG. 2, the reference symbols same as those of FIG. 1 respectively indicate the objects same as or equivalent to those of FIG. 1 and hence will not be described here any further. Additionally, in FIG. 2, the reference symbols same as those of FIG. 4 respectively indicate the objects same as or equivalent to those of FIG. 4 and hence will not be described here any further. By comparing FIG. 2 with FIG. 4, it will be appreciated that the processing step S31 of FIG. 4 is replaced by processing steps S31a and S31b in FIG. 2 and the processing step S41 of FIG. 4 is replaced by a processing step S41a in FIG. 2, whereas the processing step S42 in FIG. 4 is replaced by processing steps S42a, S42b, S42c and S42d in FIG. 2 and the processing step S43 in FIG. 4 is replaced by a processing step S43a or S43b in FIG. 2. Like the above-described known NFS, the NLM 22 receives only lock reacquisition requests in the extended lock acquisition period after a restart of the NFS server 2.

Referring to FIG. 2, firstly the NSM 23 of the NFS server 2 copies the contents of the lock acquiring client information recording section 24 to the prior-to-restart lock acquiring client information recording section 25 (S31a, S31b). As a result of this processing step, the number files acquired before the restart in the prior-to-restart lock acquiring client information recording section 25 is equal to the number of files for which locks have been acquired before the restart as recorded in the lock acquiring client information recording section 24.

Subsequently, the processing steps S32 through S35 are executed as in the case of the above described known lock reacquisition process. Then, the NLM 22 of the NFS server 2 that received a request from the NFS client during the extended lock reacquisition period determines if the request is a lock reacquisition request or not and, if it is a lock reacquisition request, the NLM 22 reacquires the lock and transmits a directive for recording in the lock acquiring client information recording section 24 with the names of the hosts of the lock reacquisition requesting NFS client 1 (S41a). Upon receiving the directive for recording, the NSM 23 records the clock time and so on of the reception of the lock reacquisition request in the lock reacquisition information recording section 26 (S42d), increments the number of files for which locks have been acquired by the NFS client in the lock acquiring client information recording section 24 by one (S42a) and compares the number of files for which locks have been acquired before the restart in the prior-to-restart lock acquiring client information recording section 25 and the number of files for which locks have been acquired in the lock acquiring client information recording section 24 for each of all the NFS clients in the prior-to-restart lock acquiring client information recording section 25 (S42b, S42c).

If it is found that the number of files for which locks have been acquired is smaller than the number of files for which locks have been acquired before the restart for all the NFS clients in the prior-to-restart lock acquiring client information recording section 25 as a result of the comparison in the processing steps S42b and S42c, the NSM 23 transmits a response to the directive for recording to the NLM 22 (S43a) and the NLM 22 continues its operation during the extended lock reacquisition period.

If, on the other hand, as a result of the comparison in the processing steps S42b and S42c, it is found that the number of files for which locks have been acquired is equal to the number of files for which locks have been acquired before the restart, the NSM 23 transmits an extended lock reacquisition period ending directive for directing the end of the extended lock reacquisition period to the NLM 22 along with the response to the directive for recording (S43b). Upon receiving the extended lock reacquisition period ending directive, the NLM 22 ends the extended lock reacquisition period regardless if the predefined extended lock reacquisition period has elapsed or not and receives lock acquisition requests to follow the lock acquisition process.

Then, the processing steps S44 through S47 are executed as in the case of the above described known lock reacquisition process.

Subsequently, as the NLM 22 receives a lock reacquisition request from an NFS client, it executes the processing steps S41a through S47. In Step S41a, the NLM 22 determines if the extended lock reacquisition period has elapsed or not and, when the extended lock reacquisition period ends, it ends the lock reacquisition process. Thereafter, the NLM 22 receives ordinary lock acquisition requests to follow the lock acquisition process.

As the NFS server 2 ends the extended lock reacquisition period when all the locks of the files that had been locked before a restart have been reacquired by following the lock reacquisition process, it is possible to reduce time to be spent before a restart of the NFS server 2 and the takeover time of the NFS having a cluster configuration.

While the lock acquiring client information recording section 24 and the prior-to-restart lock acquiring client information recording section 25 record the names of the hosts of the NFS client in the above description, they may alternatively record other identifier that can identifies the NFS client such as the IP (internet protocol) address or the MAC (media access control) address of the NFS client.

Additionally, it may be so arranged that a client operation confirmation process of ending an extended lock reacquisition period is executed when no lock reacquisition request comes from an NFS client recorded in the prior-to-restart lock acquiring client information recording section 25 for a predetermined period of time during the lock reacquisition process.

Now, such a client operation confirmation process will be described below.

A first client operation confirmation period and a second client operation confirmation period are defined in advance in the NLM 22. The first client operation confirmation period is shorter than the extended lock reacquisition period and may typically be equal to 20 seconds. The second client operation confirmation period is shorter than the first client operation confirmation period and may typically be equal to 10 seconds. As an extended lock reacquisition period starts, the NLM 22 starts the first client operation confirmation period with the extended lock reacquisition period.

In the processing step S41a in the first client operation confirmation period, the NLM 22 determines if the first client operation confirmation period has ended or not. If the first client operation confirmation period has not ended, the NLM 22 executes the above described processing step S42a and the subsequent steps. If there is an NFS client that has not transmitted any lock reacquisition request at all among the NFS clients recorded in the prior-to-restart lock acquiring client information recording section 25 by the time when the first client operation confirmation period is over, the NLM 22 starts the second client operation confirmation period.

In the processing step S41a during the second client operation confirmation period, the NLM 22 determines if the second client operation confirmation period has ended or not. If the second client operation confirmation period has not ended, the NLM 22 executes the above-described processing step S42a and the subsequent steps. If there is an NFS client that has not transmitted any lock reacquisition request at all among the NFS clients recorded in the prior-to-restart lock acquiring client information recording section 25 by the time when the second client operation confirmation period is over, the NLM 22 ends the extended lock reacquisition period. In other words, the NFS server 2 does not wait for a lock reacquisition request from any NFS client that has not responded at all to a notification from the NFS server 2 for a predetermined period of time.

When there is an NFS client that has not transmitted any lock reacquisition request at all by the time when the second client operation confirmation period is over among the NFS clients recorded in the prior-to-restart lock acquiring client information recording section 25, the NLM 22 transmits a directive for changing the number of files for which locks had been acquired before the restart by the NFS client in the prior-to-restart lock acquiring client information recording section 25 to nil (0). In other words, the NFS server 2 eliminates any NFS client that has not responded to a notification from the NFS server 2 for a predetermined period of time from the objects of operation for lock reacquisition and ends the extended lock reacquisition period when the operation of reacquiring all the other locks is over.

While a first client operation confirmation period and a second client operation confirmation period are used in the above description, it may alternatively be so arranged that only a first client operation confirmation period is used and, if there is an NFS client that has not transmitted any lock reacquisition request at all by the time when the second (first?) client operation confirmation period is over, the NFS server 2 ends the extended lock reacquisition period or changes the number of files for which locks had been acquired before the restart to 0.

With this client operation confirmation process, it is possible to prevent an increase of the waiting time of the NFS server if an NFS client does not respond properly in a lock reacquisition process.

Additionally, as information such as the clock time when a lock reacquisition request is received is recorded in the lock reacquisition information recording section, the manager of the NFS can select values for the extended lock reacquisition period, the first client operation confirmation period and the second client operation confirmation period by referring to the information so that the manger can define such values with ease.

The NFS server of this embodiment can be applied to an NFS without difficulty so as to improve the performance of the NFS, which may comprise a single server or have a cluster configuration.

The present invention also provides a program for causing the computer of an NFS server to execute the above-described processing steps as NFS server control program. It is possible to have the computer of an NFS server execute such a program by recording it in a computer readable recording medium. Examples of computer readable recording mediums that can be used for the purpose of the present invention include internal storage apparatus such as ROMs and RAMs that are mounted in computers, portable storage mediums such as CD-ROMs, flexible disks, DVD disks, magneto-optical disks and IC cards, databases holding computer programs external computers, databases of such external computers.

Note that the first lock information acquiring section corresponds to the prior-to-restart lock acquiring client information recording section 25 of the above described embodiment and the second lock information acquiring section corresponds to the lock reacquisition information recording section 26 of the above described embodiment, while the lock reacquisition ending section corresponds to the NSM 23 and the NLM 22 of the above-described embodiment.

Also note that the first lock information acquiring step of corresponds to the processing step S42c of the above-described embodiment and the second lock information acquiring step corresponds to the processing steps S42b and S42d of the above described embodiment, while the lock reacquisition ending step corresponds to the processing steps S43b and S41a of the above-described embodiment.

What is claimed is:

1. An NFS server comprising:
   a nonvolatile recording apparatus;
   a first lock information acquiring section to acquire identifiers of NFS clients that acquired locks before a restart of the NFS server and a first number of files that is a number of files for which the NFS clients have acquired the locks and records the identifiers and the first number in the nonvolatile recording apparatus;
   a second lock information acquiring section to determine if a request received after the restart is a lock reacquisition request and to acquire identifiers of NFS clients that reacquired the locks after the restart of the NFS server and a second number of files that is a number of files for which the NFS clients have reacquired the locks; and
   a lock reacquisition ending section to end the reception of lock reacquisition requests from the NFS clients if the second number of files for each of the NFS clients acquired by the second lock information acquiring section has become equal to the first number of files for each corresponding NFS client based on the first number of files acquired by the first lock information acquiring section for each NFS client and the second number of files acquired by the second lock information acquiring section for each NFS client regardless if an extended lock reacquisition period has elapsed.

2. The NFS server according to claim 1, wherein,
   if the extended lock reacquisition period has elapsed after a restart of the NFS server, the lock reacquisition ending section ends the reception of a lock reacquisition request from any of the NFS clients.

3. The NFS server according to claim 1, wherein,
   if there is an NFS client that has not transmitted any lock reacquisition request among the NFS clients recorded in the first lock information recording section at a time if a client operation confirmation period has elapsed after the restart of the NFS server, the lock reacquisition ending section ends the reception of lock reacquisition requests from the NFS client.

4. The NFS server according to claim 3, wherein,
   if the lock reacquisition ending section ends the reception of a lock reacquisition request from a specific NFS client, the lock reacquisition ending section changes the number of the first files of the NFS client to zero.

5. The NFS server according to claim 1, wherein,
   if there is an NFS client that has not transmitted any lock reacquisition request among the NFS clients recorded in the first lock information recording section before a client operation confirmation period has elapsed after the restart of the NFS server, the lock reacquisition ending section ends the reception of any lock reacquisition request from the NFS clients.

6. The NFS server according to claim 3, wherein
   the client operation confirmation period is shorter than the extended lock reacquisition period.

7. The NFS server according to claim 1, wherein
   the second lock information acquiring section additionally records the clock times of the lock reacquisition requests from NFS clients.

8. A computer-readable recording medium storing an NFS server control program, which when executed by a computer of an NFS server, causes the NFS server to perform a method, the method comprising:
   a first lock information operation acquiring identifiers of NFS clients that acquired locks before a restart of the NFS server and a first number of files that is a number of files for which the NFS clients have acquired the locks, and recording the identifiers and the first number;
   a second lock information operation acquiring identifiers of NFS clients that reacquired the locks after the restart of the NFS server and a second number of files that is a number of files for which the NFS clients have reacquired the locks; and
   a reacquisition ending operation determining if a request received after the restart is a lock reacquisition request that ends the reception of lock reacquisition requests from NFS clients if the second number of files for each of the NFS clients acquired in the second lock information acquiring operation is equal to the first number of files for each corresponding NFS client, based on the first number of files acquired in the first lock information acquiring operation for each NFS client and the second number of files acquired in the second lock information acquiring operation for each NFS client regardless if an extended lock reacquisition period has elapsed.

9. The computer-readable recording medium according to claim 8, wherein,
   if the extended lock reacquisition period has elapsed after the restart of the NFS server, the lock reacquisition ending operation ends the reception of a lock reacquisition request from the NFS clients.

10. The computer-readable recording medium according to claim 8, wherein
    if there is an NFS client that has not transmitted any lock reacquisition request among the NFS clients recorded in the first lock information recording operation before a client operation confirmation period has elapsed after the restart of the NFS server, the lock reacquisition ending operation ends the reception of lock reacquisition requests from the NFS client.

11. The computer-readable recording medium according to claim 10, wherein,
    if the lock reacquisition ending operation ends the reception of a lock reacquisition request from a specific NFS client, the lock reacquisition ending operation changes the number of the first files of the NFS client to zero.

12. The computer-readable recording medium according to claim 8, wherein,
    if there is an NFS client that has not transmitted any lock reacquisition request among the NFS clients recorded in the first lock information recording operation before a client operation confirmation period has elapsed after the restart of the NFS server, the lock reacquisition ending operation ends the reception of any lock reacquisition request from the NFS clients.

13. The computer-readable recording medium according to claim 10, wherein
the client operation confirmation period is shorter than the extended lock reacquisition period.

14. The computer-readable recording medium according to claim 8, wherein
the second lock information acquiring operation additionally records clock times of the reacquisition requests from NFS clients.

15. An NFS server control method for controlling locks of an NFS, the method comprising:
a first lock information operation acquiring identifiers of NFS clients that acquired locks before a restart of the NFS server and a first number of files that is a number of files for which the NFS clients have acquired the locks and records the identifiers of the first number;
a second lock information operation determining if a request received after the restart is a lock reacquisition request and acquiring identifiers of NFS clients that reacquired the locks after the restart of the NFS server and a second number of files that is a number of files for which the NFS clients have reacquired the locks; and
a lock reacquisition ending operation ending the reception of lock reacquisition requests from NFS clients if the second number of files for each of the NFS clients acquired in the second lock information acquiring operation has become equal to the first number of files for each corresponding NFS client, based on the first number of files acquired in the first lock information acquiring operation for each NFS client and the second number of files acquired in the second lock information acquiring operation for each NFS client regardless if an extended lock reacquisition period has elapsed.

16. The method according to claim 15, wherein,
if the extended lock reacquisition period has elapsed after a restart of the NFS server, the lock reacquisition ending operation ends the reception of a lock reacquisition request from the NFS clients.

17. The method according to claim 15, wherein
if there is an NFS client that has not transmitted any lock reacquisition request among the NFS clients recorded in the first lock information recording operation before a client operation confirmation period has elapsed after a restart of the NFS server, the lock reacquisition ending operation ends the reception of lock reacquisition requests from the NFS client.

18. The method according to claim 17, wherein,
if the lock reacquisition ending operation ends the reception of a lock reacquisition request from a specific NFS client, the lock reacquisition ending operation changes the number of the first files of the NFS client to zero.

\* \* \* \* \*